US006562479B1

(12) United States Patent
Smalley et al.

(10) Patent No.: US 6,562,479 B1
(45) Date of Patent: May 13, 2003

(54) RELEASE AGENT AND METHOD FOR PRODUCING SAME

(75) Inventors: Douglas S. Smalley, Portland, OR (US); Deanna L. Eckelman, Portland, OR (US)

(73) Assignee: Associated Chemists, Inc., Portland, OR (US)

( * ) Notice: Subject to any disclaimer, the term of this patent is extended or adjusted under 35 U.S.C. 154(b) by 0 days.

(21) Appl. No.: 09/891,514

(22) Filed: Jun. 25, 2001

(51) Int. Cl.[7] .......................... B32B 23/04; B32B 29/00
(52) U.S. Cl. ...................... 428/532; 428/535; 428/536; 428/537.5; 244/109; 244/122; 244/123; 244/300; 244/338
(58) Field of Search ................................. 428/532, 535, 428/536, 537.5; 244/109, 122, 123, 300, 338

(56) References Cited

U.S. PATENT DOCUMENTS

| | | | | |
|---|---|---|---|---|
| 3,870,665 A | * | 3/1975 | Diehr | 524/9 |
| 4,110,397 A | * | 8/1978 | Wooler | 264/338 |
| 4,409,351 A | | 10/1983 | Lee | 524/322 |
| 4,581,387 A | | 4/1986 | Werner et al. | 521/128 |
| 4,609,513 A | * | 9/1986 | Israel | 264/122 |
| 4,752,637 A | | 6/1988 | Israel | 524/702 |
| 4,772,442 A | * | 9/1988 | Trout | 264/109 |
| 4,933,232 A | * | 6/1990 | Trout | 428/301.1 |
| 5,554,438 A | * | 9/1996 | Marcinko | 428/306.6 |
| 5,607,633 A | | 3/1997 | Sleeter et al. | 264/115 |
| 5,719,301 A | | 2/1998 | Sleeter | 554/24 |
| 5,908,496 A | | 6/1999 | Singule et al. | 106/271 |
| 5,942,058 A | | 8/1999 | Sleeter et al. | 156/62.2 |
| 6,132,503 A | | 10/2000 | Singule et al. | 106/271 |

* cited by examiner

*Primary Examiner*—Leszek Kiliman
(74) *Attorney, Agent, or Firm*—Marger Johnson & McCollom, P.C.

(57) ABSTRACT

A release agent for use in formation of a lignocellulosic composite product is provided. The release agent comprising at least one fatty acid. The release agent is capable of substantially preventing a mat comprising a lignocellulosic material and an adhesive bonding agent, formed within the confines of a formation area, from adhering to said formation area, when said release agent is introduced into said formation area. The release agent is also capable of substantially reducing deposits of either adhesive bonding agent or release agent which can accumulate in the formation area.

39 Claims, No Drawings

RELEASE AGENT AND METHOD FOR PRODUCING SAME

BACKGROUND OF THE INVENTION

This invention relates to a release agent and to a method producing that release agent. The release agent is typically used during the formation of composite wood products, such as, for example, fiberboard, particleboard and the like. More specifically, the release agent is employed to substantially prevent mats of lignocellulosic material and adhesive bonding agent from adhering to a formation area, such as a press system, in which the composite wood products are produced, and from adhering to a caul screen or plate if one is used. Furthermore, the subject release agent performs several additional functions in the product formation process.

Products such as composite wood products have been found to be acceptable alternatives in most cases to natural wood paneling, sheathing and decking lumber. Composite wood products are produced from wood particles bonded together by an adhesive, the adhesive being selected according to the intended use of and the properties desired for the finished product.

Often times, the adhesive is combined with other additives to impart additional properties to the lumber. Additives can include fire retardants, insect repellants, moisture resistants, fungus resistants and color dyes. A significant advantage of composite wood products is that they have many of the properties of plywood, but can be made from lower grade wood species and waste from other wood product production. These products also can be formed into lumber in lengths and widths independent of size of the timber as harvested. A major reason for increased presence in the marketplace of the above-described product alternatives to natural solid wood lumber is that these materials exhibit properties like those of the equivalent natural solid wood lumber, especially, the properties of retaining strength, durability, stability and finish under exposure to expected environmental and use conditions.

Classes of these alternative products are multi-layer lignocellulosic products such as multi-layer oriented wood strand particleboards, particularly those with a layer-to-layer oriented strand pattern, such as OSB. Oriented, multilayer wood strand boards are composed of several layers of thin wood strands. Wood strands are wood particles having a length which is several times greater than their width. These strands are formed by slicing larger wood pieces of wood so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Oriented, multilayer wood strand boards of the above-described type are described in detail in the following U.S. Pat. Nos.: 3,164,511, 4,364,984, 5,435,976, 5,470,631, 5,525,394, and 5,718,786, all of which are incorporated herein by reference.

Typical adhesive systems employed in the manufacture of composite wood products such as particleboard and fiberboard, and particularly in multi-layer wood products, comprise aldehyde resins and/or polymeric isocyanates. Aldehyde resins, particularly PF resins, are still the most widely used adhesives for the production of exterior grade composite wood-based panels. However, isocyanates (in particular MDI polymers) have been used in the wood industry for almost 25 years. These isocyanate materials alone, or in combination with an aldehyde resin, can produce excellent results when used as adhesives for particulate ligncellulosic products.

During the manufacture of composite lignocellulosic products, the lignocellulosic mats can adhere to the production equipment, particularly to caul screens and press platens. The upshot of this adhering problem is substantially increased production downtime, press damage, and even can be press fires. Also, if lignocellulosic material is mixed with an adhesive in a blender, cleanup can be quite difficult and time consuming.

In order to prevent the problem of lignocellulosic mats adhering to the production equipment during the manufacture of composite lignocellulosic products, a release agent was sprayed onto the caul screens and onto the surface of the mat of lignocellulosic material before the mat contacted the press platens.

U.S. Pat. No. 4,110,397 discloses composite bodies or sheets made from multiple compositions in which an isocyanate based binding agent is used. A metallic soap is used at the interface of the composition and the mold surface to assist release. The metallic soap is a metal salt of a long chain fatty acid.

U.S. Pat. No. 4,581,387 discloses internal release agents comprising esters and/or amides used in the manufacture of polyisocyanate polyurea molded parts. The esters and/or amides prepared by reacting a mixture of montanic acid and a carboxylic acid having ten or more carbon atoms with a polyol, alkanol-amine, or polyamine.

U.S. Pat. Nos. 4,772,442 and 4,933,232 relate to isocyanate carboxyl group for the manufacture of lignocellulosic composites. Disclosed are internal and external binder release agents which are fatty materials having at least one polymerized fatty acid and/or at least one polycarboxyl compound containing a polymeric fatty radical.

U.S. Pat. Nos. 5,607,633, 5,719,301 and 5,942,058 relate to co-adhesive systems for binding composite materials. The co-adhesive can be a conjugated trigylceride.

U.S. Pat. No. 5,554,438 relates to a self-release binder comprising an organic polyisocyanate binder and a composition comprising wax and a fatty acid.

SUMMARY OF THE INVENTION

The invention is directed to a release agent and a method for making same. The release agent of this invention is typically used in formation of a lignocellulosic composite products. The release agent is typically introduced into the formation area.

The release agent comprises at least one fatty acid and is capable of substantially preventing a mat comprising a lignocellulosic material and an adhesive bonding agent, generally formed within the confines of a formation chamber, from adhering to the formation area, such as a press system, and preferably having a plurality of platens. Additionally, the release agent is capable of substantially reducing deposits of either adhesive bonding agent or release agent which can accumulate in the formation area. Preferably, the release agent removes deposits of adhesive bonding agent and release agent from the surfaces of equipment used in the manufacture of the lignocellulosic composite product. For example, the build up of residue in the formation area, such as on the press system or on caul screens or caul plates can be substantially decreased so that the amount of cleaning required of this equipment during production is significantly diminished.

In a preferred form of this invention, the mat is formed on a caul screen or caul plate located within the formation area. The caul screen or caul plate will have a substantially longer useful life due to the substantial reduction in adhesive binding material and release agent deposits in the formation area on the caul screen or caul plate.

The release agent preferably is formed of at least one fatty acid which is preferably a branched fatty acid. More preferably, the branched fatty acid is neodecanoic acid.

The release agent preferably comprises at least about 5% by weight neodecanoic acid, more preferably comprises at least about 10% by weight neodecanoic acid, and most preferably comprises at least about 15% by weight neodecanoic acid, based on the total weight of the fatty acid.

In addition to the preferred neodecanoic acid branched fatty material, the release agent preferably includes fatty acids which produce a liquid soap at room temperature. Other fatty acids which can be employed with the neodecanoic acid are tall oil fatty acids, oleic acid, and mixtures with fatty acids of vegetable oils such as soybean, cottonseed, peanut, canola, olive, and corn. Therefore, the preferred composition which can be employed and is other than neodecanoic acid comprises up to 95% by weight tall oil fatty acid, more preferably comprises up to about 90% by weight tall oil fatty acid, and most preferably comprises up to about 85% by weight tall oil fatty acid, based on the total weight of the release agent.

In order to maintain the release agent at a preferred pH of from about 8 to about 11, and more preferably between about 9 and 10, a base is introduced, as needed, to the release agent formulation. The quantity of base employed is an amount which is at least sufficient to neutralize the release agent. Preferably, the base employed is potassium hydroxide, although other basic materials can be employed such as NaOH or an amine.

The release agent of this invention is capable of substantially reducing the amount of adhesive bonding agent and release agent which is deposited on the lignocellulosic composite product so that discoloration of the lignocellulosic composite product is substantially decreased. Furthermore, when at least one paper overlay is applied to the mat to produce a paper-overlaid lignocellulosic composite product, the paper-overlaid lignocellulosic composite product will exhibit a substantial reduction in adhesive binding agent and release agent deposits on the paper-overlaid lignocellulosic composite product. Thus, discoloration of the paper-overlaid lignocellulosic composite product will be substantially decreased.

Also attributing to a substantial increase in the production rate of the lignocellulosic composite product when the release agent of the present invention is utilized is a corresponding substantial cutback in the degassing time. A lessening of the degassing time should lead to a resultant increase in production rate and profit to the end user. Thus, when the release agent of this invention is introduced as provided herein, the cycle time for decompressing and degassing the lignocellulosic product is substantially less than the cycle time for decompressing and degassing a lignocellulosic composite product which is produced without that release agent.

The lignocellulosic composite product is preferably selected from a group consisting of particleboard and fiberboard. The product is most preferably a multilayer product. Most preferably, this product comprises an oriented strand board.

Another aspect of the invention has to do with the paintability of the product. It has been found that when the subject release agent is used according to the teaching of this invention, it does not substantially bleed through a painted surface of the lignocellulosic composite product. Preferably, when at least one paper overlay is applied to produce a paper-overlaid lignocellulosic composite product, the release agent is not substantially bleed through a painted paper-overlaid surface of the paper-overlaid lignocellulosic composite product. Using Method B of ASTM 6.02 D3359-97 excellent paint adhesion was found in all samples tested. Visual observation of paper-overlaid OSB made with release agents other than those provided according to the teachings of this invention showed undesirable substantial visible mottling of the surface. Apparently the release agent was bleeding through the paint. Using the release agents of the present invention, no substantial visible mottling of the surface of a paper-overlaid OSB was evidenced.

In another preferred embodiment, a blender having a admixing area for admixing the lignocellulosic material and the adhesive bonding agent is provided. The admixing area in the blender is treated with said release agent. The admixture from the blender can then be readily removed without requiring substantial further cleaning of said blender. More preferably, the blender is coated with the release agent and allowed to dry before adhesive and lignocellulosic material are added thereto. In this case, the admixture can be readily removed from the blender without requiring substantial further cleaning of the blender.

The release agent provides improvement from an environmental standpoint. Preferably, the amount of release agent emissions discharged from the formation chamber in the production of said lignocellulosic composite product is substantially reduced.

The foregoing and other objects, features and advantages of the invention will become more apparent from the detailed description of a preferred embodiment of the invention below.

DETAILED DESCRIPTION OF THE PRESENT INVENTION

The term "lignocellulosic product", as used herein, can describe a number of lignocellulosic board products, preferably including multi-layer lignocellulosic board products. A primary example of such a lignocellulosic board product is particleboard or fiberboard or strawboard. A primary example of such a multi-layer lignocellulosic board product is OSB.

The lignocellulosic products of this invention can be prepared by application of an adhesive bonding material to lignocellulosic material such as particles, chips or wafers, more specifically wood particles, wood chips and lignocellulosic fibers. Preferably the lignocellulosic material is formed into layers. Similarly, the method of the present invention and its attendant advantages can be achieved with respect to various forms of lignocellulosic starting material and is not limited to any particular form. The use of wood particles and wafers, for example, in the formation of a typical OSB product comprises the preferred environment for the method of the present invention.

Mixtures of lignocellulosic particles may also be used. Typically, such materials are wood particles derived from wood and wood residues such as wood chips, wood fibers, shavings, veneers, wood wool, cork, bark, sawdust, and the like. Particles of other lignocellulosic material such as shredded paper, pulp or vegetable fibers such as corn stalks, straw, bagasse and the like may also be used.

Adhesive is typically blended with the above lignocellulosic materials using rotary blenders to achieve thorough mixing and dispensing of the adhesives. The adhesive bonding system of the present invention generally comprises an isocyanate polymer and/or an aldehyde polymer resin. The adhesive bonding system can also be an isocyanate/latex copolymer or a phenol-formaldehyde/latex copolymer. The polymers, which form the adhesive bonding system, are typically in liquid form so that they can be applied directly to a major surface of a layer of lignocellulosic material. The polymer resins can be combined together prior to their application.

The aldehyde polymer resins can comprise thermosetting resins such as phenol-formaldehyde, resorcinol-formaldehyde, melamine-formaldehyde, urea-formaldehyde, modified lignosulfonates, urea-furfural and condensed furfuryl alcohol resins. The phenolic component can include any one or more of the phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para-positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols include: phenol, 2,6 xylenol, o-cresol, m-cresol, p-cresol, 3,5-xylenol, 3-4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The isocyanate polymer may suitably be any organic isocyanate polymer compound containing at least 2 active isocyanate groups per molecule, or mixtures of such compounds. Generally, the isocyanate polymers employed in the method of this invention are those which have an isocyanato group functionality of at least about two. Preferably, this functionality ranges from 2.3 to 3.5 with an isocyanate equivalent of 132 to 135. The isocyanato functionality can be determined from the percent available NCO groups and the average molecular weight of the isocyanate polymer composition. The percent available NCO groups can be determined by the procedures of ASTM test method D1638.

The isocyanate polymers which can be employed in the method of the present invention can be those that are typically employed in adhesive compositions, including typical aromatic, aliphatic and cycloaliphatic isocyanate polymers. Representative aromatic isocyanate polymers include 2,4-tolylene diisocyanate, 2,6-tolylene diisocyanate, 4,4'-methylene bis(phenyl isocyanate), 1,3-phenylene diisocyanate, triphenylmethane triisocyanate, 2,4,4'-triisocyanatodiphenyl ether, 2,4-bis(4-isocyanatobenzyl) phenylisocyanate and related polyaryl polyiscocyanates, 1,5-naphthalene diisocyanate and mixtures thereof. Representative aliphatic isocyanate polymers include hexamethylene diisocyanate, xylylene diisocyanate, and 1,12-dodecane diisocyanate and lysine ethyl ester diisocyanate. Representative cycloaliphatic isocyanate polymers include 4,4'-methylenebis (cyclohexyl isocyanate), 1,4-cyclohexylene diisocyanate, 1-methyl-2,4-cyclohexylene diisocyanate and 2,4-bis(4-isocyanatocyclhexylmethyl) cyclohexyl isocyanate.

The isocyanate polymer is typically applied in its liquid form. Generally, when a phenol-formaldehyde resin is used as the phenolic resin it is present in the adhesive composition used in the method of the present invention within the range of about 50 to 90% by weight, preferably within the range of about 60 to 80% by weight of the total amount of adhesive. Generally, the isocyanate polymer is present in an amount of about 5% to 40% isocyanate polymer, preferably 10 to 35% isocyanate polymer, and most preferably 15 to 30% isocyanate polymer, by weight. When the adhesive bonding system is used according to these percentages, one achieves a commercially attractive combination of desired board properties and economic advantages.

The preferred formation of the layers of lignocellulosic material typically involves the application of an adhesive bonding composition to the lignocellulosic material with subsequent application of heat and pressure to form the layers into its desired consolidated configuration. It should be appreciated that the adhesive composition can be applied to the lignocellulosic particles in any conventional means, such as spraying of the adhesive composition onto the lignocellulosic particles.

Various emission press systems can be employed in the practice of the present invention. In each case, at least one of the lower and upper platen is capable of forming the lignocellulosic product. The emission press system can include upper platen and lower platen defining therewithin a product formation press. It can also include, if desired, a plurality of additional intermediate upper and lower platens. These intermediate upper and lower platens typically have the same configuration as the upper and lower platens. A screen caul is usually located on upper surface of lower platen. The screen caul supports a mat comprising lignocellulosic particles and adhesive resin mat during the heating and pressing thereof.

What is claimed is:

1. A release agent used in formation of a lignocellulosic composite product, which comprises:
   a release agent comprising at least one branched fatty acid,
   said release agent substantially preventing a mat comprising a lignocellulosic material and an adhesive bonding agent, formed within the confines of a formation area, from adhering to said formation area, when said release agent is introduced into said formation area,
   said release agent substantially reducing deposits of either adhesive bonding agent or release agent which accumulates in the formation area.

2. The release agent of claim 1, wherein at least one said fatty acid is neodecanoic acid.

3. The release agent of claim 2, wherein said release agent comprises at least about 5% by weight neodecanoic acid, based on the total weight of said fatty acid.

4. The release agent of claim 1, wherein the release agent comprises at least about 10% by weight neodecanoic acid, based on the total weight of said fatty acid.

5. The release agent of claim 1, wherein the release agent comprises at least about 15% by weight neodecanoic acid, based on the total weight of said fatty acid.

6. The release agent of claim 1, wherein the release agent removes deposits of adhesive bonding agent and release agent from the surfaces of equipment used in the manufacture of the lignocellulosic composite product.

7. The release agent of claim 1, which is substantially reducing the amount of adhesive bonding agent and release agent which is deposited on the lignocellulosic composite product so that discoloration of the lignocellulosic composite product is substantially decreased.

8. The release agent of claim 1, wherein degassing time of the lignocellulosic composite product in the formation area is substantially reduced and the rate of producing the lignocellulosic composite product is substantially increased.

9. The release agent of claim 1, wherein said product is selected from a group consisting of strawboard, particleboard and fiberboard.

10. The release agent of claim 1, wherein said product comprises oriented strand board.

11. The release agent of claim 1, wherein said product is a multilayer product.

12. The release agent of claim 1, wherein the mat is formed on a caul screen or caul plate located within the formation area, the caul screen or caul plate having a substantially longer useful life due to the substantial reduction in adhesive binding material and release agent deposits in the formation area on said caul screen or caul plate.

13. The release agent of claim 1, wherein at least one paper overlay is applied to the mat to produce a paper-overlaid lignocellulosic composite product, and the paper-overlaid lignocellulosic composite product exhibits a substantial reduction in adhesive binding agent and release agent deposits on the paper-overlaid lignocellulosic composite product so that discoloration of the paper-overlaid lignocellulosic composite product is substantially decreased.

14. The release agent of claim 1, which is not substantially bleed through a painted surface of the lignocellulosic composite product.

15. The release agent of claim 1, wherein wherein at least one paper overlay is applied to produce a paper-overlaid lignocellulosic composite product, and the release agent does not substantially bleed through a painted paper-overlaid surface of the paper-overlaid lignocellulosic composite product.

16. The release agent of claim 1, wherein cycle time for decompressing and degassing said lignocellulosic product in said formation area is substantially less than the cycle time for decompressing and degassing a lignocellulosic composite product in said formation area which is produced without said release agent.

17. The release agent of claim 1, wherein the formation area comprises a press system.

18. The release agent of claim 1, which includes the steps of providing a blender having a admixing area for admixing the lignocellulosic material and the adhesive bonding agent, treating the admixing area in the blender with said release agent, and readily removing said admixture from said blender without requiring substantial further cleaning of said blender.

19. The release agent of claim 1, wherein the amount of release agent emissions discharged from the formation chamber in the production of said lignocellulosic composite product is substantially reduced.

20. A method for use in formation of a lignocellulosic composite product, which comprises:
   forming a release agent comprising at least one branched fatty acid,
   said release agent substantially preventing a mat comprising a lignocellulosic material and an adhesive bonding agent, formed within the confines of a formation area, from adhering to said formation area, when said release agent is introduced into said formation area,
   said release agent substantially reducing deposits of either adhesive bonding agent or release agent which accumulates in the formation area.

21. The method of claim 20, wherein at least one said fatty acid is neodecanoic acid.

22. The method of claim 21, wherein said release agent comprises at least about 5% by weight neodecanoic acid, based on the total weight of said fatty acid.

23. The method of claim 20, wherein the release agent comprises at least about 10% by weight neodecanoic acid, based on the total weight of said fatty acid.

24. The method of claim 20, wherein the release agent comprises at least about 15% by weight neodecanoic acid, based on the total weight of said fatty acid.

25. The method of claim 20, wherein the release agent removes deposits of adhesive bonding agent and release agent from the surfaces of equipment used in the manufacture of the lignocellulosic composite product.

26. The method of claim 20, which is substantially reducing the amount of adhesive bonding agent and release agent which is deposited on the lignocellulosic composite product so that discoloration of the lignocellulosic composite product is substantially decreased.

27. The method of claim 20, wherein degassing time of the lignocellulosic composite product in the formation area is substantially reduced and the rate of producing the lignocellulosic composite product is substantially increased.

28. The method of claim 20, wherein said product is selected from a group consisting of strawboard, particleboard and fiberboard.

29. The method of claim 20, wherein said product comprises oriented strand board.

30. The method of claim 20, wherein said product is a multilayer product.

31. The method of claim 20, wherein the mat is formed on a caul screen or caul plate located within the formation area, the caul screen or caul plate having a substantially longer useful life due to the substantially reduction in adhesive binding material and release agent deposits in the formation area on said caul screen or caul plate.

32. The method of claim 20, wherein at least one paper overlay is applied to the mat to produce a paper-overlaid lignocellulosic composite product, and the paper-overlaid lignocellulosic composite product exhibits a substantial reduction in adhesive binding agent and release agent deposits on the paper-overlaid lignocellulosic composite product so that discoloration of the paper-overlaid lignocellulosic composite product is substantially decreased.

33. The method of claim 20, which is not substantially bleed through a painted surface of the lignocellulosic composite product.

34. The method of claim 20, wherein wherein at least one paper overlay is applied to produce a paper-overlaid lignocellulosic composite product, and the release agent is not substantially bleed through a painted paper-overlaid surface of the paper-overlaid lignocellulosic composite product.

35. The method of claim 20, wherein cycle time for decompressing and degassing said lignocellulosic product in said formation area is substantially less than the cycle time for decompressing and degassing a lignocellulosic composite product in said formation area which is produced without said release agent.

36. The method of claim 20, wherein the formation area comprises a press system.

37. The method of claim 20, which includes the steps of providing a blender having a admixing area for admixing the lignocellulosic material and the adhesive bonding agent, treating the admixing area in the blender with said release agent, and readily removing said admixture from said blender without requiring substantial further cleaning of said blender.

38. The method of claim 20, wherein the amount of release agent emissions discharged from the formation chamber in the production of said lignocellulosic composite product is substantially reduced.

39. A method for producing a lignocellulosic composite product, which comprises:

forming a mat comprising a lignocellulosic material and an adhesive bonding agent in a formation area, applying a release agent in said formation area, said release agent comprising at least one branched fatty acid which substantially prevents said mat from adhering to said formation area, when said release agent is introduced into said formation area;

bonding together said mat with said bonding agent to produce said lignocellulosic composite product without the accumulation of substantial deposits of either adhesive bonding agent or release agent in the formation area.

* * * * *

UNITED STATES PATENT AND TRADEMARK OFFICE
CERTIFICATE OF CORRECTION

PATENT NO.   : 6,562,479 B1
DATED        : May 13, 2003
INVENTOR(S)  : Smalley et al.

It is certified that error appears in the above-identified patent and that said Letters Patent is hereby corrected as shown below:

<u>Column 6,</u>
Line 61, "which accumulates" should read -- which can accumulate --.

<u>Column 7,</u>
Line 11, "which is substantially" should read -- which is capable of substantially --.

<u>Column 8,</u>
Line 11, "which accumulates" should read -- which can accumulate --.
Line 28, "which is substantially" should read -- which is capable of substantially --.

Signed and Sealed this

Twenty-fifth Day of November, 2003

JAMES E. ROGAN
*Director of the United States Patent and Trademark Office*